US008281804B2

(12) United States Patent
Lin et al.

(10) Patent No.: US 8,281,804 B2
(45) Date of Patent: Oct. 9, 2012

(54) PRESSURE RELIEF VALVES

(75) Inventors: Chun Lin, McKinney, TX (US); Roy Ronald Pelfrey, Sherman, TX (US)

(73) Assignee: Fisher Controls International LLC, St. Louis, MO (US)

( * ) Notice: Subject to any disclaimer, the term of this patent is extended or adjusted under 35 U.S.C. 154(b) by 898 days.

(21) Appl. No.: 12/169,405

(22) Filed: Jul. 8, 2008

(65) Prior Publication Data

US 2010/0006159 A1    Jan. 14, 2010

(51) Int. Cl.
*F16K 21/06* (2006.01)

(52) U.S. Cl. ..................................... 137/514.5; 137/529

(58) Field of Classification Search .............. 137/514.5, 137/514.7, 469, 529; 251/360
See application file for complete search history.

(56) References Cited

U.S. PATENT DOCUMENTS

| | | | | |
|---|---|---|---|---|
| 2,676,782 | A * | 4/1954 | Bostock et al. ........... | 137/516.29 |
| 2,754,841 | A * | 7/1956 | Eddy ........................... | 137/469 |
| 3,351,081 | A * | 11/1967 | Bogossian et al. ........... | 137/223 |
| 4,638,832 | A * | 1/1987 | Mokveld ........................ | 137/220 |
| 4,742,846 | A * | 5/1988 | DiBartolo .................. | 137/514.5 |
| 4,790,348 | A * | 12/1988 | Gausman et al. ........ | 137/516.29 |
| 7,077,157 | B2 | 7/2006 | Cavagna | |
| 2004/0089347 | A1 | 5/2004 | Cavagna | |

FOREIGN PATENT DOCUMENTS

| | | |
|---|---|---|
| JP | 56-042771 A | 4/1981 |
| JP | 2001-317645 A | 11/2001 |
| WO | 2005-075863 A1 | 8/2005 |

OTHER PUBLICATIONS

Patent Cooperation Treaty, "Written Opinion of the International Searching Authority," issued by the International Searching Authority in connection with related PCT application No. PCT/US2009/045306, mailed Jan. 13, 2010 (4 pages).
Patent Cooperation Treaty, "International Search Report," issued by the International Searching Authority in connection with related PCT application No. PCT/US2009/045306, mailed Jan. 13, 2010 (3 pages).
Chinese Patent Office, "First Office Action," issued in connection with Chinese Patent Application No. 200980126861.1, mailed on Apr. 1, 2012, 11 pages.

* cited by examiner

*Primary Examiner* — Kevin Lee
*Assistant Examiner* — Macade Brown
(74) *Attorney, Agent, or Firm* — Hanley, Flight & Zimmerman, LLC

(57) ABSTRACT

Pressure relief valves are described herein. An example pressure relief valve includes a body having external threads to threadably engage another body having a pressurized chamber. Additionally, the pressure relief valve includes a relief valve orifice that is threadably engaged with the body via internal threads of the body. The relief valve orifice includes a seating surface. Further, the pressure relief valve includes a pressure-balanced piston assembly that is slidably movable within the body relative to the relief valve orifice and the seating surface to control the flow of fluid between the pressurized chamber and the relief valve orifice.

23 Claims, 3 Drawing Sheets

PRESSURE RELIEF VALVES

FIELD OF THE DISCLOSURE

This patent relates generally to valves and, more specifically, to pressure relief valves.

BACKGROUND

Pressure relief valves are used in a variety of commercial, industrial and domestic applications to maintain a pressure within a container below a predetermined maximum pressure. Specifically, if the pressure within the container exceeds a start-to-discharge pressure or predetermined maximum pressure, the pressure relief valve will vent a fluid or vapor to the atmosphere until the pressure within the container decreases below the predetermined maximum pressure. The amount and rate at which the fluid or vapor is vented to the atmosphere is associated with the magnitude of the pressure within the container.

Different pressure relief valves have different sizes, start-to-discharge pressures and flow capacities. A pressure relief valve may be selected for use with a container based on a design specification of the container such as a maximum pressure to which the container can be safely exposed without rupturing.

Known pressure relief valves often include a single spring that exerts a force on a shaft to urge a valve seat towards a seating surface. Containers that have a relatively high maximum pressure require a pressure relief valve that has a spring with a relatively large spring rate to maintain the position of the valve seat relative to the seating surface. Typically, in known pressure relief valve applications, springs with relatively large spring rates are considerably longer (e.g., have a larger length) than springs with relatively small spring rates. As a result, pressure relief valves that require a spring with a relatively large spring rate significantly increase the overall size and length of the pressure relief valve. In practice, if a plurality of pressure relief valves are used with a manifold assembly, each of the plurality of pressure relief valves is at least partially positioned within one of a plurality of tubes coupled to the manifold assembly. Typically, each tube is substantially the same length as the pressure relief valve and is made of a metal material and, thus, the length and weight of the pressure relief valve drastically impacts the overall weight and size (e.g., height) of the manifold assembly.

Additionally, springs with relatively large spring rates are typically made of a material that has a significantly higher yield stress as compared to springs with relatively small spring rates. Depending on the environment in which the pressure relief valve is used, springs made with material that has a relatively high yield stress may be susceptible to hydrogen embrittlement. Hydrogen embrittlement decreases the life of the spring and may enable the pressure relief valve to malfunction and vent fluid or vapor to the atmosphere when the pressure within the chamber is below the start-to-discharge pressure.

SUMMARY

In one example embodiment, a pressure relief valve includes a body having external threads to threadably engage another body having a pressurized chamber. Additionally, the pressure relief valve includes a relief valve orifice that is threadably engaged with the body via internal threads of the body. The relief valve orifice includes a seating surface. Further, the pressure relief valve includes a pressure-balanced piston assembly that is slidably movable within the body relative to the relief valve orifice and the seating surface to control the flow of fluid between the pressurized chamber and the relief valve orifice.

DETAILED DESCRIPTION

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The example pressure relief valves described herein may be configured to exert substantially the same force to urge a seat of the pressure relief valve to engage a seating surface as some known pressure relief valves that are provided with a spring that has a relatively large spring rate. However, the example pressure relief valves described herein have a smaller overall size and require a spring with a significantly smaller spring rate as such known pressure relief valves. Specifically, the example pressure relief valves described herein are provided with a pressure-balanced piston assembly that works in conjunction with a spring to exert a force in a direction. More specifically, the pressure-balanced piston assembly partially defines a pressure-balanced chamber that is fluidly coupled to a tank that has a pressure that acts within the pressure-balanced chamber to urge a seat to engage a seating surface thereby significantly reducing the force that the spring has to provide to maintain the pressure relief valve in a closed condition below a start-to-discharge pressure.

Figure 1:
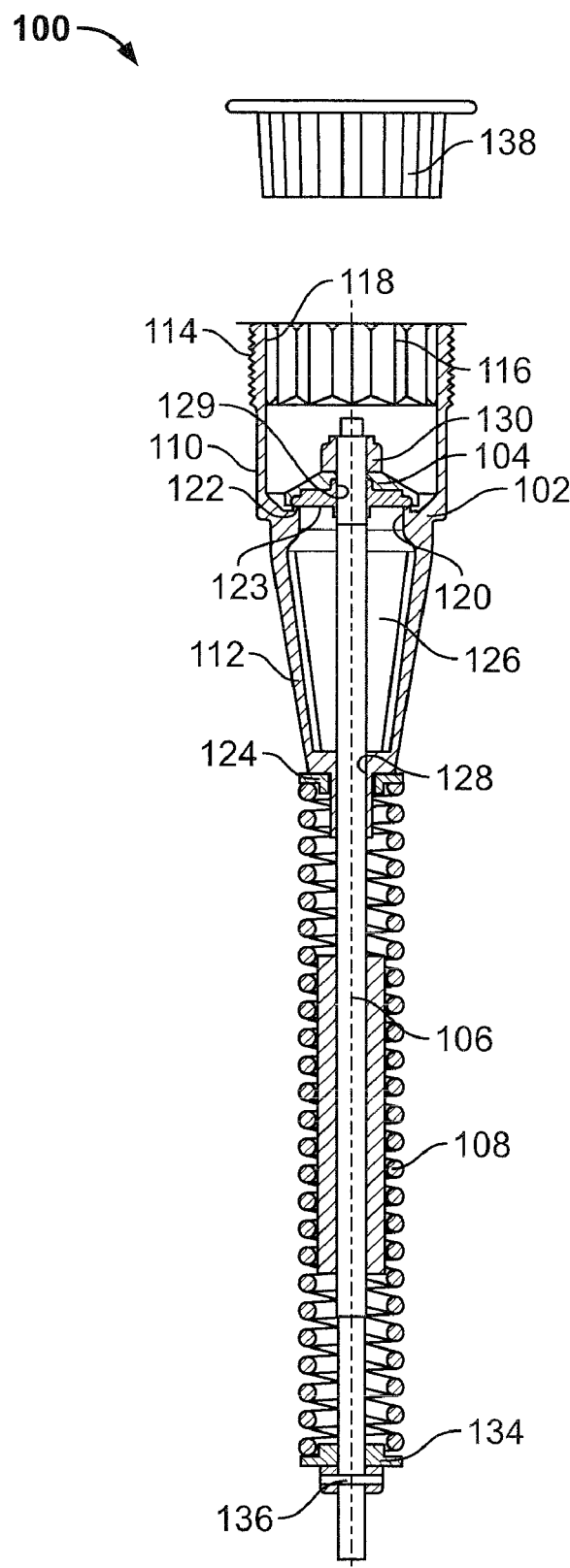
FIG. 1 depicts a known pressure relief valve.

FIG. 1 depicts a known pressure relief valve 100 that includes a body 102, a seat 104, a stem 106 and a spring 108. The body 102 is machined from a single piece of material and includes an upper portion 110 and a lower portion 112. The upper portion 110 is substantially cylindrical and the lower portion 112 is at least partially tapered.

The upper portion 110 includes a threaded exterior surface 114 that threadingly engages an opening (not shown) of a chamber or tank (not shown) such as, a propane tank. The upper portion 110 defines a first chamber 116 that includes an opening 118 that fluidly couples the pressure relief valve 100 to the atmosphere. Additionally, the upper portion 110 defines an aperture 120 that has a seating surface 122. The seating surface 122 is engaged by a surface 123 of the seat 104 to substantially prevent fluid from exiting the pressure relief valve 100 through the aperture 120 to the atmosphere.

The lower portion 112 is partially tampered toward the spring 108 and includes a shoulder or step 124 that acts as a spring guide or seat to position the spring 108 relative to the body 102. The lower portion 112 defines a second chamber 126 that is fluidly coupled to a pressure within the tank via an opening (not shown) and fluidly coupled to the first chamber 116 via the aperture 120. Additionally, the second chamber 126 defines an opening 128 that receives the stem 106.

The seat 104 defines an opening 129 through which the stem 106 is positioned. The seat 104 is coupled to the stem 106 via a nut 130 that is threaded onto the stem 106 such that the seat 104 is positioned between the seating surface 122 and the nut 130. Additionally, in a closed position, the surface 123 of the seat 104 partially engages the seating surface 122 and prevents fluid from flowing from the second chamber 126 to the first chamber 116.

The spring 108 is positioned around the stem 106 between the step 124 and a spring seat 134. The spring seat 134 is coupled to the stem 106 via a nut 136 such that the spring seat 134 is positioned between the spring 108 and the nut 136. The spring 108 exerts a force on the stem 106 to urge the surface 123 of the seat 104 to engage the seating surface 122. A spring rate of the spring 108 is associated with a start-to-discharge pressure of the tank. Specifically, the force provided by the spring 108 is equal to a force exerted on the surface 123 by the start-to-discharge pressure. Equation 1 below represents the relationship between the force exerted by the start-to-discharge pressure (e.g., force=pressure*area) and the force exerted by the spring 108 (e.g., spring force), where A is the area of the surface 123 on which the pressure of the tank acts, P is the start-to-discharge pressure and $F_{spring}$ is the spring force.

$$F_{spring} = P*A \qquad \text{Equation 1}$$

As discussed above, the pressure within the tank acts against a portion of the surface 123. If the pressure acting against the surface 123 is lower than the start-to-discharge pressure, the force exerted by the spring 108 is greater than the force exerted by the pressure and, thus, the surface 123 of the seat 104 will engage the seating surface 122 to prevent fluid from flowing through the aperture 120. Alternatively, if the pressure within the tank is greater than the start-to-discharge pressure, the pressure acting on the surface 123 overcomes the force of the spring 108 and the surface 123 of the seat 104 disengages the seating surface 122 to enable fluid flow from a tank, vessel or other pressurized chamber to exit the pressure relief valve 100. Once the pressure within the tank has decreased below the start-to-discharge pressure, the force of the spring 108 overcomes the force exerted by the pressure in the tank and the surface 123 engages the seating surface 122.

To inspect the seat 104, once the pressure relief valve 100 has been removed from the tank, a rain cap 138 is removed from the first chamber 116, and the nut 130 and the seat 104 are removed from the stem 106. The seat 104 can then be inspected.

As discussed above, in some applications, the force provided by the spring 108 must be relatively large and, thus, may result in subjecting the spring 108 to considerable amounts of stress. Consequently, in some applications, the spring 108 must be made of a material that has a relatively high yield stress. However, a spring 108 made with a material that has a relatively high yield stress is susceptible to hydrogen embrittlement if exposed to pure propane, hydrogen sulfide ($H_2S$) or other such elements and/or components, which significantly reduce the life of the spring 108.

Figure 2:
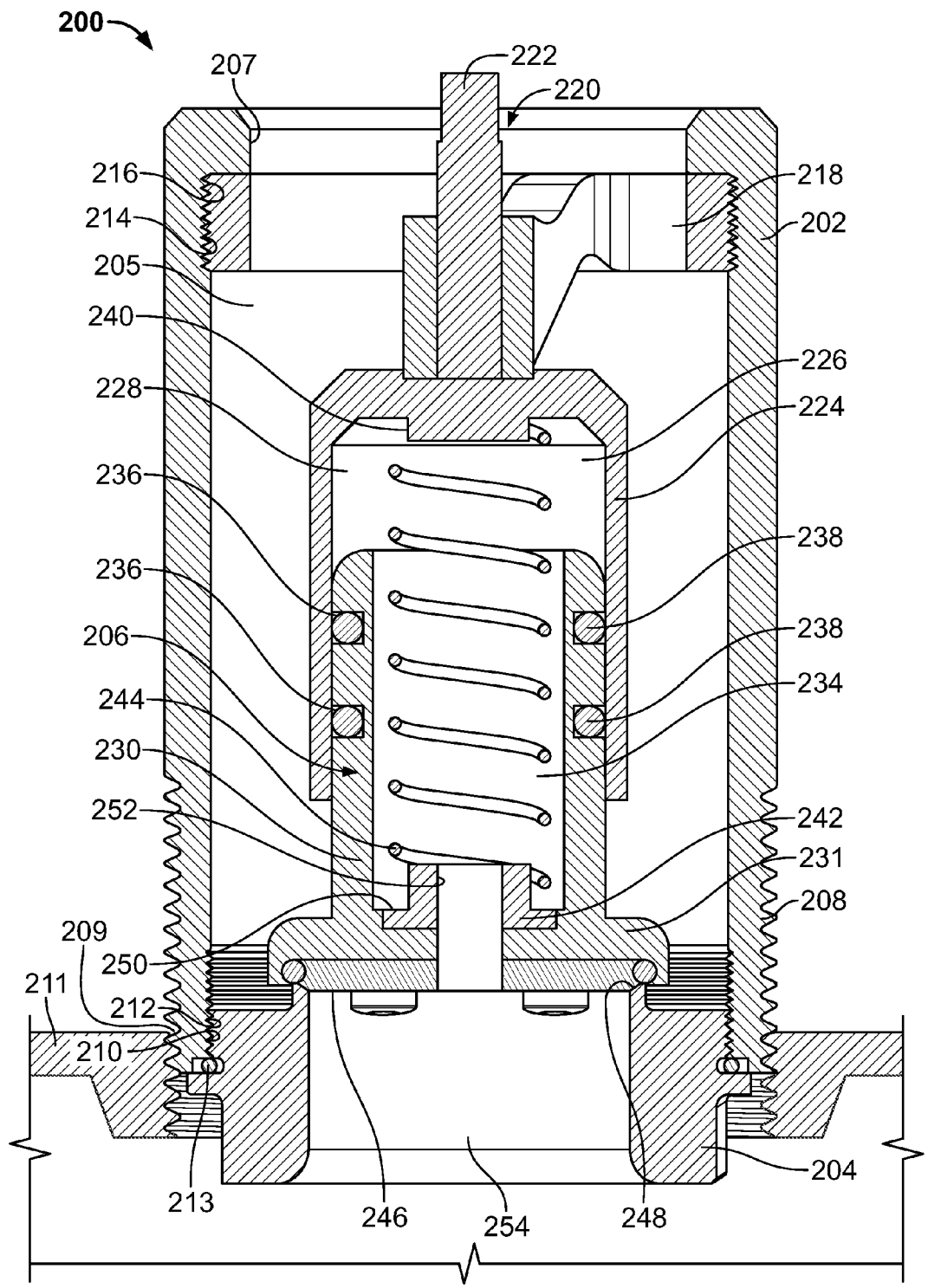
FIG. 2 depicts an example pressure relief valve including an example pressure-balanced piston assembly.

FIG. 2 depicts an example pressure relief valve 200 that includes a body 202, a relief valve orifice 204, and a pressure-balanced piston assembly 206 (e.g., a piston assembly 206). The body 202 defines a bore 205 that is fluidly coupled to the atmosphere via an opening 207. Additionally, the body 202 defines external threads 208 that engage an opening 209 of a chamber, tank or other vessel 211 such as, for example, a propane tank or a component of a manifold assembly. Internal threads 210 are positioned opposite the external threads 208 and engage corresponding threads 212 of the relief valve orifice 204. A seal 213 (e.g., an o-ring) is positioned between the body 202 and the relief valve orifice 204. The seal 213 substantially prevents fluid from passing between the body 202 and the relief valve orifice 204. At an opposite end, the body 202 defines threads 214 that engage threads 216 of a plate 218 of a spring load adjuster 220.

The spring load adjuster 220 includes the plate 218, an adjuster 222, and an upper pressure chamber body 224. The upper pressure chamber body 224 defines a bore 226 that at least partially defines a pressure-balanced chamber 228. The adjuster 222 is externally accessible to enable a set point and/or a spring load of the pressure relief valve 200 to be adjusted without disassembling the pressure relief valve 200. Additionally, rotating or turning the adjuster 222 changes a position of the spring load adjuster 220 relative to the body 202. In other example implementations, the spring load of the pressure relief valve 200 may not be adjustable and, in those implementations, the pressure relief valve 200 may not include the threads 214 and 216.

The piston assembly 206 includes an elongated portion 230 and a seat 231. A diameter of the bore 226 substantially corresponds to a diameter of the elongated portion 230 such that the elongated portion 230 is slidably and sealably movable relative to the upper pressure chamber body 224. The elongated portion 230 defines a bore 234 that at least partially defines the pressure-balanced chamber 228. Additionally, opposite the bore 234, the elongated portion 230 defines a plurality of grooves 236 each of which receives a seal 238 (e.g., an o-ring). The seals 238 substantially prevent fluid from passing between the upper pressure chamber body 224 and the elongated portion 230.

The upper pressure chamber body 224 defines a first spring seat 240 that is opposite a second spring seat 242 defined by the piston assembly 206. A spring 244 is positioned between the first and second spring seats 240 and 242. The spring 244 exerts a force in a first direction on the piston assembly 206 to urge a portion of a surface 246 of the seat 231 to engage a seating surface 248. As discussed below in more detail, the spring 244 may be relatively small and may be made of a material such as, for example, 302 steel, which may have a relatively low yield stress and which may not be susceptible to hydrogen embrittlement.

A surface 250 of the piston assembly 206 has a first area that is opposite the surface 246, which has a second area larger than the first area. The second spring seat 242 and the seat 231 define an aperture 252 that fluidly couples the pressure-balanced chamber 228 to a pressure of a tank such that the pressure acts against the first area and the second area. A force applied to the first area via the pressure assists the spring 244 in urging the surface 246 of the seat 231 to engage the seating surface 248 while an opposite force applied to the second area via the pressure urges the surface 246 of the seat 231 to disengage the seating surface 248.

A spring rate of the spring 244 and the first area are associated with a start-to-discharge pressure of the tank. Specifically, the spring force plus the start-to-discharge pressure multiplied by the first area (e.g., force=pressure*area) is equal to the start-to-discharge pressure multiplied by the second area. In operation, fluidly coupling the pressure from the tank to the pressure-balanced chamber 228 reduces the spring force needed to achieve a desired start-to-discharge pressure and/or to urge the surface 246 of the seat 231 to engage and seal against the seating surface 248. As discussed above, springs that have relatively low spring rates also may be made of material that has a relatively low yield stress and less susceptible to hydrogen embrittlement, which increases the useable life of the spring 244. Typically, springs with relatively low spring rates are substantially smaller than springs with relatively large spring rates, which reduces the size and weight of the pressure relief valve 200. Equation 2 below represents the relationship between the pressure exerted on the first area and the second area and the force exerted by the spring 244 (e.g., the spring force), where $F_{spring}$ is the spring force, P is the pressure of the fluid in the tank, $A_2$ is the second area against which the pressure acts, and $A_1$ is the first area against which that the pressure acts.

$$F_{spring}=P*(A_2-A_1) \qquad \text{Equation 2}$$

As discussed above, the pressure within the tank acts against the first area and the second area. If the pressure acting against the second area is below the start-to-discharge pressure, the force exerted by the spring 244 and the pressure acting against the first area will result in a force that is larger than the pressure acting against the second area and, thus, the surface 246 of the seat 231 will engage the seating surface 248. Alternatively, if the pressure within the tank is above the start-to-discharge pressure, the pressure acting against the second area creates a force that overcomes the force exerted by the spring 244 and the pressure acting against the first area and, thus, the surface 246 of the seat 231 disengages the seating surface 248. Disengaging the seat 231 from the seating surface 248 enables fluid to exit the pressure relief valve 200 through an aperture 254 defined by the relief valve orifice 204 to the atmosphere via the opening 207. Venting the excess pressure to the atmosphere decreases the pressure within the tank below the start-to-discharge pressure. Once the pressure within the tank is below the start-to-discharge pressure, the force exerted by the spring 244 and the pressure acting against the first area result in a force that overcomes the pressure acting against the second area and the surface 246 of the seat 231 again engages the seating surface 248 to substantially prevent additional fluid from exiting through the pressure relief valve 200.

Turning briefly to FIG. 1, the known pressure relief valve 100 is machined from a single piece of material which, because of design requirements, may require the material thickness of the upper portion 110 to be different from the material thickness of the lower potion 112. Different material thicknesses may lead to porosity in the material, which decreases the structural integrity of the material and the known pressure relief valve 100. Additionally, because the known pressure relief valve 100 is machined from a single piece of material, it is common for the seating surface 122 to be improperly machined creating an edge or surface that may damage (e.g., cut) the surface 123 (e.g., a gasket) of the seat 104 as it engages the seating surface 122. Further, machining the upper and lower portions 110 and 112 from a single piece of material increases the complexity and/or time required to accomplish routine maintenance and/or inspection on the pressure relief valve 100 and its components.

Turning back to FIG. 2, in contrast to the known pressure relief valve 100, the body 202 and the relief valve orifice 204 are separately machined or otherwise fabricated. Machining the components separately addresses the issues encountered by the known pressure relief valves discussed above. Specifically, machining the relief valve orifice 204 separately from the body 202 enables a thickness of the body 202 to be substantially consistent and a thickness of the relief valve orifice 204 to be substantially consistent, which significantly reduces porosity produced during casting. Additionally, machining the relief valve orifice 204 separately from the body 202 simplifies machining the pressure relief valve 200 and increases the consistency with which the seating surface 248 conforms to design specifications. Further, machining the relief valve orifice 204 separately from the body 202 simplifies inspection and/or maintenance performed on the pressure relief valve 200 such as, for example, inspecting, repairing and/or replacing the piston assembly 206, the seat 231, the spring 244 or any other component.

In some examples, to manufacture and assemble the pressure relief valve 200, the body 202, the relief valve orifice 204, the spring load adjuster 220 and the piston assembly 206 are machined or otherwise fabricated from different pieces of material (e.g., different castings). The spring load adjuster 220 is then threaded into the body 202. Next, the spring 244 is positioned within the bore 234 and the piston assembly 206 is inserted into the bore 226 until the spring 244 is seated against the first spring seat 240. The relief valve orifice 204 is then threaded into the body 202 until the surface 246 engages the seating surface 248. To adjust the set point and/or a spring load of the pressure relief valve 200, the adjuster 222 may be turned (e.g., rotated) until the desired set point is achieved. To inspect the seat 231, the surface 246 of the seat 231 and/or the seating surface 248, the pressure relief valve 200 is unscrewed from the tank. The surface 246 and/or the seating surface 248 may then be inspected by looking through the aperture 254 or by unscrewing the body 202 from the relief valve orifice 204. The body 202, the relief valve orifice 204, the spring load adjuster 220 and the piston assembly 206 may be made of the same or different materials, which may be any suitable material such as a metal material (e.g., a brass material, a stainless steel material, etc.).

In practice, a plurality of the pressure relief valves 200 may be coupled directly to or integrally coupled to a manifold assembly (not shown). In contrast to known pressure relief valves 100, each of the plurality of pressure relief valves 200 is not partially positioned with a tube (not shown) coupled to the manifold assembly. In addition to the pressure relief valve 200 having a significantly reduced weight as compared to known pressure relief valves 100, the pressure relief valve 200 further reduces the overall weight of the manifold assembly. Accordingly, the manifold assembly and, specifically, the manifold assembly body (not shown), may have design requirements and/or specifications that are associated with the size and weight of the example pressure relief valve 200.

Figure 3:
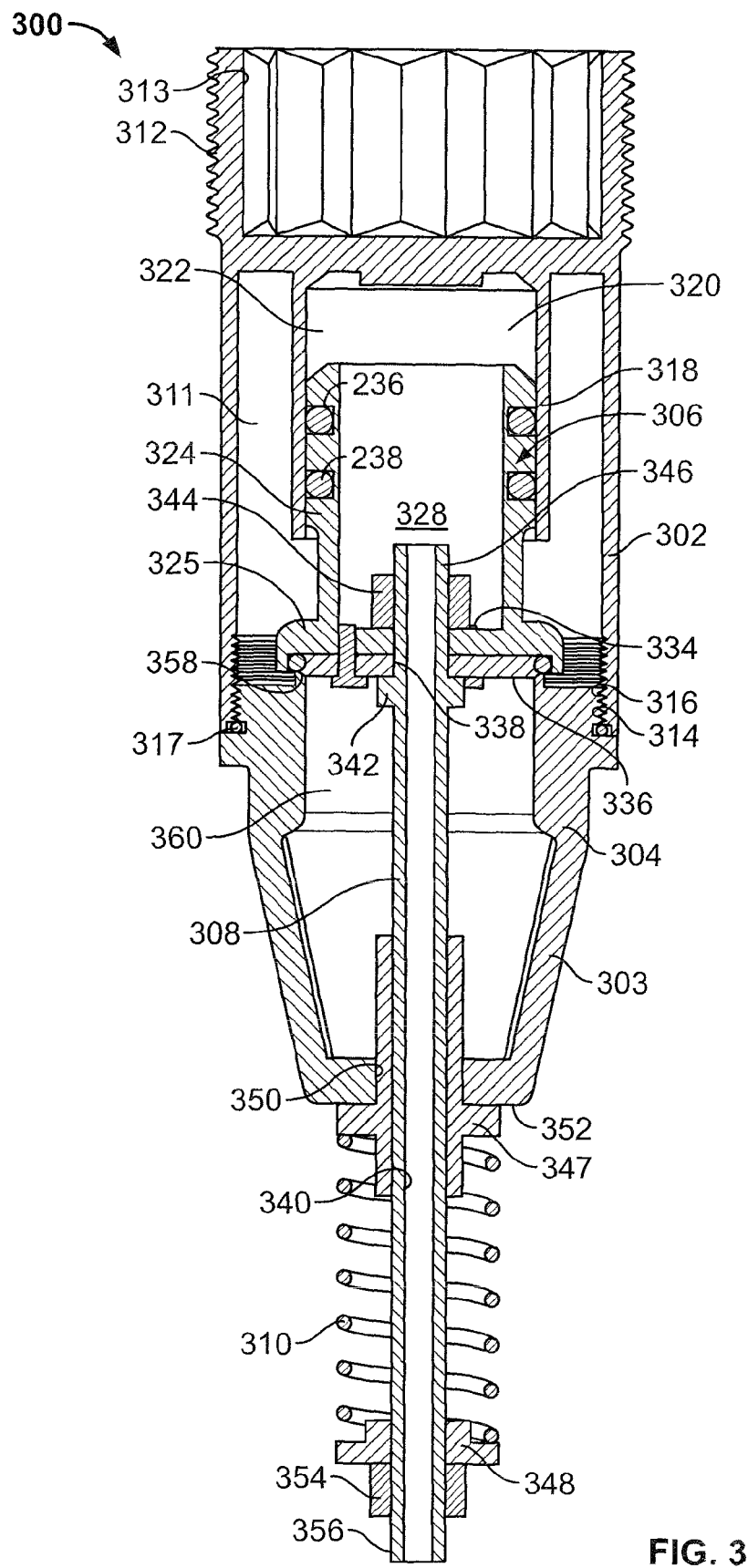
FIG. 3 depicts another example pressure relief valve including another example pressure-balanced piston assembly.

FIG. 3 depicts another example pressure relief valve 300 that includes a body 302, a mount or yoke 303 that is provided with a relief valve orifice 304, a pressure-balanced piston assembly 306 (e.g., a piston assembly 306), a shaft or stem 308 and a spring 310. The example pressure relief valve 300 of FIG. 3 may include structure similar to the structure(s) described above in the example pressure relief valve 200 of FIG. 2. The body 302 defines a bore 311 that is fluidly coupled to the atmosphere via an opening 313. Additionally, the body 302 defines external threads 312 that engage an opening (not shown) of a chamber, tank or other vessel (not shown) such as, for example, a propane tank or a component of a manifold assembly. Internal threads 314 are positioned on an opposite end of the body 302 and engage corresponding threads 316 of the relief valve orifice 304. A seal 317 (e.g., an o-ring) is positioned between the body 302 and the relief valve orifice 304. The seal 317 substantially prevents fluid from passing between the body 302 and the relief valve orifice 304.

The body 302 includes an upper pressure chamber body 318 that defines a bore 320 that at least partially defines a pressure-balanced chamber 322. The piston assembly 306 includes an elongated portion 324 and a seat 325. A diameter of the bore 320 substantially corresponds to a diameter of the elongated portion 324 such that the elongated portion 324 is slidably and sealably movable relative to the upper pressure chamber body 318. The elongated portion 324 defines a bore 328 that at least partially defines the pressure-balanced chamber 322.

A surface 334 of the piston assembly 306 has a first area that is opposite a surface 336 of the seat 325 that has a second area larger than the first area. The seat 325 of the piston assembly 306 defines an aperture 338 through which the stem 308 is positioned. The stem 308 fluidly couples the pressure-balanced chamber 322 to a pressure of a tank or other vessel via an aperture 340 defined by the stem 308 (e.g., the stem 308 is hollow or has a passage therethrough) to enable a pressure from a tank or other vessel to act against the first area and the second area.

The stem 308 is provided with a stepped portion 342 that at least partially abuts the surface 336 of the seat 325. Additionally, a nut 344 is threaded onto an end 346 of the stem 308 and couples the piston assembly 306 to the stem 308. The stem 308 may be centrally positioned relative to the seat 325 and may assist in aligning the spring 310 relative to the yoke 303. Specifically, the spring 310 surrounds the stem 308 and is positioned between a first spring seat 347 and a second spring seat 348. The first spring seat 347 is partially positioned within an aperture 350 defined by the yoke 303 and abuts a surface 352 of the yoke 303. Additionally, a nut 354 is threaded onto an end 356 of the stem 308 and positions the second spring seat 348 between the nut 354 and the spring 310. In this example implementation, the yoke 303 is partially tapered toward the spring 310. However, the yoke 303 may have any other suitable shape.

As discussed above, a force applied to the first area via a pressure (e.g., exerted by a fluid in a chamber, tank, or other vessel to which the pressure relief valve 300 is coupled) assists the spring 310 in urging the surface 336 of the seat 325 to engage and seal against a seating surface 358, while an opposing force applied to the second area via the pressure urges the surface 336 of the seat 325 to disengage the seating surface 358.

If the pressure acting against the second area is lower than the start-to-discharge pressure, the force exerted by the spring 310 and the pressure acting against the first area will result in a force that is larger than the pressure acting against the second area and, thus, the surface 336 of the seat 325 will engage the seating surface 358. Alternatively, if the pressure within the tank is greater than the start-to-discharge pressure, the pressure acting against the second area results in a force that overcomes the force exerted by the spring 310 and the pressure acting against the first area and, thus, the surface 336 of the seat 325 disengages the seating surface 358. Disengaging the seat 325 from the seating surface 358 enables fluid to exit the pressure relief valve 300 through an aperture 360 defined by the relief valve orifice 304 and to the atmosphere via the opening 313. Venting the excess pressure to the atmosphere decreases the pressure within the tank or other vessel below the start-to-discharge pressure. Once the pressure within the tank is below the start-to-discharge pressure, the force exerted by the spring 310 and the pressure acting against the first area result in a force that overcomes the pressure acting against the second area, and the surface 336 of the seat 325 again engages the seating surface 358 to substantially prevent additional fluid from exiting through the pressure relief valve 300.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A pressure relief valve, comprising:
    a body defining a flow path to be fluidly coupled to the atmosphere, the body having external threads to threadably engage another body having a pressurized chamber;
    a relief valve orifice that is threadably engaged with the body via internal threads of the body, wherein the relief valve orifice includes a seating surface;
    a spring load adjuster partially defining a pressure-balanced chamber, the spring load adjuster movable relative to the body to adjust a set point of the pressure relief valve; and
    a pressure-balanced piston assembly partially defining the pressure-balanced chamber, the pressure-balanced piston assembly movable relative to the spring load adjuster and the seating surface to control the flow of fluid between the pressurized chamber and the atmosphere, the flow path and the pressure-balanced piston assembly being disposed along a longitudinal axis of the pressure relief valve.

2. The pressure relief valve as defined in claim 1, wherein the pressure-balanced chamber is to be fluidly coupled to the pressurized chamber.

3. The pressure relief valve as defined in claim 2, wherein a pressure from the pressurized chamber is to exert a force to urge the pressure-balanced piston assembly toward the relief valve orifice and the seating surface.

4. The pressure relief valve as defined in claim 2, wherein a pressure from the pressurized chamber is to act against a first area and a second area of the pressure-balanced assembly, wherein the first area is opposite the second area.

5. The pressure relief valve as defined in claim 4, wherein the second area is larger than the first area.

6. The pressure relief valve as defined in claim 1, further comprising at least one spring disposed within the pressure-balanced chamber to exert a force within the pressure-balanced chamber to urge the pressure-balanced piston assembly toward the relief valve orifice and the seating surface.

7. The pressure relief valve as defined in claim 6, wherein the spring load adjuster is to change a load provided by the at least one spring.

8. The pressure relief valve as defined in claim 7, wherein the spring load adjuster is externally accessible to enable adjusting a set point without having to disassemble the pressure relief valve.

9. The pressure relief valve as defined in claim 7, wherein the spring load adjuster is positioned adjacent an outlet of the flow path, the outlet fluidly coupled to the atmosphere.

10. The pressure relief valve as defined in claim 6, wherein the spring comprises a steel material.

11. The pressure relief valve as defined in claim 6, wherein the spring is positioned in the flow path.

12. The pressure relief valve as defined in claim 1, wherein the pressure-balanced chamber is disposed substantially within the flow path.

13. The pressure relief valve as defined in claim 1, further comprising an outlet of the flow path positioned at a first end of the pressure relief valve and fluidly coupled to the atmosphere.

14. The pressure relief valve as defined in claim 13, wherein the relief valve orifice is positioned at a second end of the pressure relief valve opposite the first end.

15. The pressure relief valve as defined in claim 1, wherein the flow path is positioned between an interior surface of the body and the pressure-balanced chamber.

16. The pressure relief valve of claim 1, wherein a set point of the pressure relief valve is based on a surface area difference between first and second opposing surfaces of the pressure-balanced piston assembly and a biasing element that is to urge the pressure-balanced piston assembly toward the seating surface, the first surface to at least partially define the pressure-balanced chamber.

17. The pressure relief valve of claim 16, wherein, the pressure-balanced piston assembly is to disengage the seating surface when a pressure acting on the first surface is substantially equal to a pressure acting on the second surface.

18. A pressure relief valve, comprising:
a body including means for removably engaging another body having a pressurized chamber, the body defining a flow path therethrough;
a relief valve orifice including a seating surface and means for removably engaging the body; and
a pressure-balanced piston assembly disposed substantially within the flow path and including means for controlling a flow of fluid between the pressurized chamber and the relief valve orifice, wherein a set point of the pressure relief valve is based on a surface area difference between first and second opposing surfaces of the pressure-balanced piston assembly and a biasing element that is to urge the pressure-balanced piston assembly toward the seating surface, the first surface to at least partially define a pressure-balanced chamber.

19. The pressure relief valve as defined in claim 18, further comprising means for fluidly coupling the pressurized chamber to the pressure-balanced chamber at least partially defined by the body and the pressure-balanced piston assembly.

20. The pressure relief valve as defined in claim 18, wherein the biasing element is positioned within the pressure-balanced chamber to urge the pressure-balanced piston assembly toward the relief valve orifice and the seating surface.

21. The pressure relief valve as defined in claim 18, further comprising means for aligning the biasing element.

22. The pressure relief valve as defined in claim 18, wherein the means for aligning the biasing element is positioned outside the pressure-balanced chamber to urge the pressure-balanced piston assembly toward the relief valve orifice and the seating surface.

23. A pressure relief valve, comprising:
a body defining a flow path to be fluidly coupled to the atmosphere, the body comprising external threads to threadably engage another body having a pressurized chamber and a relief valve orifice comprising a seating surface, wherein the body at least partially defines a pressure-balanced chamber;
a pressure-balanced piston assembly that at least partially defines the pressure-balanced chamber, the pressure-balanced piston assembly movable within the body relative to the seating surface to control the flow of fluid between the pressurized chamber and the atmosphere, wherein, the pressure-balanced piston assembly is to disengage the seating surface when a pressure of the pressure-balanced chamber is substantially equal to a pressure of the pressurized chamber.

* * * * *